United States Patent
Perrone et al.

(10) Patent No.: US 7,400,277 B2
(45) Date of Patent: Jul. 15, 2008

(54) METHOD AND SYSTEM FOR THE COMPRESSION OF PROBABILITY TABLES

(75) Inventors: Michael P. Perrone, Yorktown Heights, NY (US); Eugene H. Ratzlaff, Hopewell Junction, NY (US); Jianying Hu, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 10/818,567

(22) Filed: Apr. 6, 2004

(65) Prior Publication Data

US 2005/0231401 A1 Oct. 20, 2005

(51) Int. Cl.
*H03M 7/00* (2006.01)

(52) U.S. Cl. .................. 341/107; 341/106; 341/65; 341/67

(58) Field of Classification Search .................. 341/107, 341/106, 59, 65, 67
See application file for complete search history.

(56) References Cited

U.S. PATENT DOCUMENTS

| | | | | |
|---|---|---|---|---|
| 5,689,589 A * | 11/1997 | Gormish et al. | ............. | 382/239 |
| 5,886,655 A * | 3/1999 | Rust | ........................... | 341/107 |
| 6,275,176 B1 * | 8/2001 | Bruekers et al. | ........... | 341/107 |
| 6,691,305 B1 * | 2/2004 | Henkel et al. | ............... | 717/136 |
| 6,954,156 B2 * | 10/2005 | Kadono et al. | ................ | 341/67 |
| 7,088,269 B2 * | 8/2006 | Kadono et al. | ................ | 341/67 |
| 7,161,506 B2 * | 1/2007 | Fallon | ........................ | 341/51 |
| 7,190,289 B2 * | 3/2007 | Kobayashi et al. | .......... | 341/107 |
| 2003/0128140 A1 * | 7/2003 | Xie et al. | .................... | 341/107 |
| 2006/0145897 A1 * | 7/2006 | Kadono et al. | ................ | 341/59 |

* cited by examiner

*Primary Examiner*—Linh V Nguyen
(74) *Attorney, Agent, or Firm*—Scully, Scott, Murphy & Presser, P.C.; Daniel P. Morris, Esq.

(57) ABSTRACT

The present invention relates to a method, computer program product and system for the compression of a probability table and the reconstruction of one or more probability elements using the compressed data and method. After determining a probability table that is to be compressed, the probability table is compressed using a first probability table compression method, wherein the probability table compression method creates a first compressed probability table. The first compressed probability table contains a plurality of probability elements. Further, the probability table is compressed using a second probability table compression method, wherein the probability table compression method creates a second compressed probability table. The second compressed probability table containing a plurality of probability elements. A first probability element reconstructed using the first compressed probability table is thereafter merged with a second probability element reconstructed using the second compressed probability table in order to produce a merged probability element.

19 Claims, 6 Drawing Sheets

METHOD AND SYSTEM FOR THE COMPRESSION OF PROBABILITY TABLES

FIELD OF THE INVENTION

The present invention relates to the field of statistical machine learning and in particular to the computational methods that require random access to large probability tables.

BACKGROUND OF THE INVENTION

Currently, there is a continuing desire for improved handwriting recognition (HWR) systems, in particular for handheld devices such as PDAs and smart phones. Embedded HWR systems that are used in such devices should provide high accuracy and real-time speed with a small memory footprint.

Scanning n-tuple (SNT) classifiers provide accurate, high-speed recognition for offline or online character data. SNTs are maximum-likelihood classifiers that are applied to chain code feature sequences, where the probability of observing the complete code is given by the ensemble probability for observing all of the SNTs derived from the chain code.

SNT recognizers have demonstrated the potential for excellent speed and accuracy for on-line HWR analysis, but regrettably these recognizers consume significant memory resources. The present invention significantly reduces the memory use of the SNT recognizer through the use of mixture models and distributional clustering techniques. It is to be understood that this invention is applicable to any system that uses one or more probability tables.

SNT Recognizer

In regard to the implementation of a mixture model technique for probability table compression, each character sample of a character class C, the SNT algorithm generates a variable length sequence of features, $f_1, \ldots f_L$. We define the i-th n-tuple of a given feature sequence to be:

$$X^i_{1,N} = (f_{i+k}, f_{i+2k}, \ldots, f_{i+Nk}) \quad \text{(Equation 1)}$$

Where $i=1, \ldots L-Nk$, and k is the sub-sampling distance. The SNT assumes that the n-tuples are all independent, thus the probability of observing a given sequence of n-tuples is given by:

$$P(\bigcup_i X^i_{1,N} \mid C) = \prod_i P(X^i_{1,N} \mid C) \quad \text{(Equation 2)}$$

The joint probability $P(X_{1,N}|C)$ is modeled by a lookup table of the normalized frequency counts of each of the possible n-tuples observed in the n-tuples for all the data for a given class C.

In regard to the implementation of a distributional clustering technique for probability table compression for each sample of a character class $c_i$, the SNT algorithm generates a variable length chain code that is sub-sampled into tuples of length n with features $f_1, f_2, \ldots f_n$, where each code f ranges from 0 to $\sigma-1$.

In training, we assume a uniform distribution of the class prior probabilities $p(c_i)$ for the set of Q character classes $C=\{c_1, c_2, \ldots c_Q\}$ and estimate the probability distribution $P(C|T_i)$ of the observed n-tuples at each i. In decoding, given a sequence of observed n-tuples $\tau=(t_1, t_2, \ldots, t_M)$, where $t_k \in \{T_1, T_2, \ldots, T_{\sigma^n}\}$, $k=1,2, \ldots, M$, the SNT classifier assumes that the n-tuples are mutually independent. Note, in addition that $X^i_{1,N} \in \{T_1, T_2, \ldots T_{\sigma^n}\}$.

Using the Bayes rule and assuming a uniform distribution of class prior probabilities, it can be shown that the posterior probability of the input belonging to class $c_i$, $p(c_i|\tau)$, is determined by the product of the conditional probabilities of class $c_i$ given each individual n-tuple. Thus the classifier selects the character class with highest posterior probability as given by:

$$c = \arg\max_i \prod_{k=1}^{M} p(c_{i_j} \mid t_k) \quad \text{(Equation 3)}$$

where each $p(c_i|t_k)$ is drawn from the $\sigma_n \times Q$ probability look-up table generated in training.

Unfortunately, these look-up tables can become very large with commonly used values of $n \geq 5$ and $\sigma = 8$, making it impractical for embedded applications. The present invention comprises a method that can compress such look-up tables allowing the n-tuple method good performance with nominal accuracy loss at 20:1 compression, but which can scale to compressions of more than 5000:1 with only moderate increases in the error rate.

Compression of Joint Probability Tables Using Mixture Models

As with the SNT, conditional and joint probability tables are incorporated in many other on-line handwriting recognition systems for representing relationships between discrete random variables. N-gram language models and Bayesian networks are two such examples. One of the practical problems with such tables is that the table size grows exponentially with the number of random variables.

When such joint probability tables must be compressed, three factors should be considered. First, a compression algorithm should have a high compression ratio. Second, it should not severely degrade recognition accuracy. Third, it should not slow the recognizer so as to compromise real-time responsiveness. Many algorithms have been introduced for image and data communications compression (e.g. arithmetic coding, JPEG).

These methods are generally inappropriate for probability tables because the table data must be randomly accessed with minimal computational cost. In the literature of language model compression, quantization and pruning methods are used. Quantization allows probability terms to be represented with only one or two bytes rather than four. With pruning methods, high order conditional probabilities are approximated with low order ones. Those probability elements that can be approximated reliably are pruned away from tables.

Joint probability tables utilized within the present invention are decomposed into lower-dimensional components and their mixtures. Then, model parameters are quantized into integers of a predetermined size. This algorithm satisfies the three criteria for practical application. It has a high compression ratio. It classifies quickly because only linear operations are employed using integer math.

Distributional Clustering of N-Tuples

Consider the random variable over character classes, C, and its distribution given a particular n-tuple $T_i$, denoted $P(C|T_i)$. The idea behind distributional clustering of n-tuples is that if two distinct n-tuples, $T_i$ and $T_j$ induce similar class distributions, they can be clustered together and represented by a single distribution that is the weighted average of the individual distributions:

$$P(C \mid T_i \vee T_j) = \frac{P(T_i)P(C \mid T_i) + P(T_j)P(C \mid T_j)}{P(T_i) + P(T_j)} \quad \text{(Equation 4)}$$

To be more general, from now on we will use the notion of class distribution given a particular event, $E_i$, denoted $P(C|E_i)$. Tuples belonging to the same cluster are treated as identical events and induce the same class distribution. Since we now only need to store one distribution per event as opposed to one per distinct n-tuple, this paradigm leads to a compression ratio of $\sigma^n$:M, where M is the number of events. The small overhead of a look up table mapping any n-tuple to an event is in most cases negligible compared to the size of the probability table. Please note, in regards to equation 4 that other methods to those skilled in the art may also be used.

Measuring the Effect of Merging Two Distributions

Given two distributions $P(C|E_i)$ and $(C|E_j)$, the information theoretic measure for the difference between them is the Kullback-Leibler (KL) divergence measure defined as:

$$D(P(C \mid E_i) \| P_-(C \mid E_j)) = -\sum_{k=1}^{Q} p\left(c_k \mid E_i \log\left(\frac{p(c_k \mid E_i)}{p(c_k \mid E_j)}\right)\right) \quad \text{(Equation 5)}$$

Unfortunately this measure has two undesirable properties: it is not symmetric, and it is infinite when a class has nonzero probability in the first distribution and zero probability in the second. A related measure called "KL divergence to the mean" is defined as:

$$\frac{P(E_i)}{P(E_i \vee E_j)} \cdot D(P(C \mid E_i) \| P(C \mid E_i \vee E_j)) + \quad \text{(Equation 6)}$$

$$\frac{P(E_j)}{P(E_i \vee E_j)} \cdot D(P(C \mid E_j) \| P(C \mid E_i \vee E_j))$$

In information theoretical terms, this measure can be understood as the expected amount of inefficiency incurred if, instead of compressing two distributions optimally with their own code, we use the code that would be optimal for their mean. This measure not only avoids the two undesirable properties of the classic KL measure, but the measure is also more suitable for clustering as it measures directly the effect of merging two distributions into one. For the purpose of n-tuple clustering in the context of character recognition, we desire to further modify this measure to take into account the cumulative effect of merging two distributions on the final classification. As shown in Equation 3, each n-tuple encountered in the input character is treated as an independent event and the class likelihood of all the events are accumulated to produce the final score.

Thus, the true cost of merging two distributions should be further weighted by the prior probability of the joint event, the less frequently two events are likely to occur, the smaller the impact of merging their distributions. We call this new measure the "weighted mean KL divergence", it is defined as:

$D_f(E_i,E_j)=P(E_i)\cdot$
$D(P(C|E_i)\|P(C|E_i\vee E_j))+P(E_j)\cdot$
$D(P(C|E_j)\|P(C|E_i\vee E_j))$ (Equation 7)

This is the distance measure we will use to cluster the n-tuple distributions. It is understood that there are many different methods for calculating the difference and/or similarities between two distributions. Any method for measuring distance between distributions known to those skilled in the art can be used.

SUMMARY OF THE INVENTION

The present invention relates to a method, computer program product and system for the compression of a probability table and recovery of probability table elements based upon mixture models and distributional clustering models.

An embodiment of the present invention comprises a method of implementing a computer for the compression of probability tables through the use of compressed probability tables. The method comprises the steps of determining a probability table that is to be compressed, wherein the probability table contains a plurality of probability elements; and compressing the probability table using a first probability table compression method, wherein the probability table compression method creates a first compressed probability table. The first compressed probability table contains a plurality of probability elements. Further, the probability table is compressed using a second probability table compression method, wherein the probability table compression method creates a second compressed probability table. The second compressed probability table contains a plurality of probability elements.

A probability element extracted using the first compressed probability table is merged with a probability element extracted using the second compressed probability table in order to produce a merged probability element. Please note, that while embodiments the present invention are disclosed that utilize two compressed probability tables, further embodiments may utilize two or more probability tables that have been compressed using differing compression methods.

An aspect of the present invention comprises a method for the compression of a probability table using distributional clustering. The method comprises the steps of determining a probability table that is to be compressed, wherein the probability table contains a plurality of probability elements and evaluating the probability elements of the probability table in order to determine related probability elements of the probability table that can be replaced with a compressed probability element.

A compressed probability table is generated, wherein the compressed probability table contains probability elements that are compressed, wherein the probability table elements that have been determined to have related values are represented by a single compressed probability element. Next the method comprises the step of creating an index for the compressed probability table that maps the index for each probability element of the probability table to a new index for the corresponding compressed probability element of the compressed probability table, wherein the indices of similar probability elements will map to the index of a single compressed probability element.

Another aspect of the present invention comprises a method for the compression of a probability table using mixture model probability table compression. The method comprises the steps of determining a joint probability table that is to be compressed, wherein the joint probability table contains a plurality of probability elements. A first probability table is generated, the first probability table containing probability mixture elements. Next, a second probability table is generated; the probability table containing probability mixture coefficients. The first and second probability tables are optimized in order to generate a compressed mixture model of the joint probability table, wherein the compressed mixture model contains compressed mixture model elements. Lastly, the compressed mixture model elements of the compressed mixture model are quantized into integers of a predetermined size.

A further embodiment of the present invention comprises a computer system for the compression of probability tables through the use of compressed probability tables. The system comprises a means for determining a probability table that is to be compressed, wherein the probability table contains a plurality of probability elements. Further, the system comprises a means for compressing the probability table using a first probability table compression method, wherein the probability table compression method creates a first compressed probability table, the first compressed probability table containing a plurality of probability elements, and a means for compressing the probability table using a second probability table compression method, wherein the probability table compression method creates a second compressed probability table, the second compressed probability table containing a plurality of probability elements. Additionally, the system comprises a means for merging a probability element reconstructed using the first compressed probability table with a probability element reconstructed using the second compressed probability table in order to produce a merged probability element.

A yet further embodiment of the present invention comprises a method of implementing a computer for the recovery of selected probability elements through the use of compressed probability tables. The method comprises the steps of determining if a probability look-up table element address is located within a discrepancy table and returning the corresponding probability value if the probability look-up table element address is located in the discrepancy table. If the probability look-up table element address is not located in the discrepancy table, then the method retrieves a compressed probability element, which has been compressed using a first compression method that corresponds with the probability look-up table element address. Further, the method retrieves a compressed probability element, which has been compressed using a second compression method that corresponds with the probability look-up table element address if the probability look-up table element address is not located in the discrepancy table. The two retrieved compressed probability elements are merged the in order to produce a merged probability element.

A further aspect of this method comprises retrieving more than two compressed probability elements that have been compressed using differing compression methods.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Embodiments of the present invention are described below in detail. The disclosed embodiments are intended to be illustrative only, since numerous modifications and variations therein will be apparent to those of ordinary skill in the art. In reference to the drawings, like numbers will indicate like parts continuously throughout the views.

Figure 1:
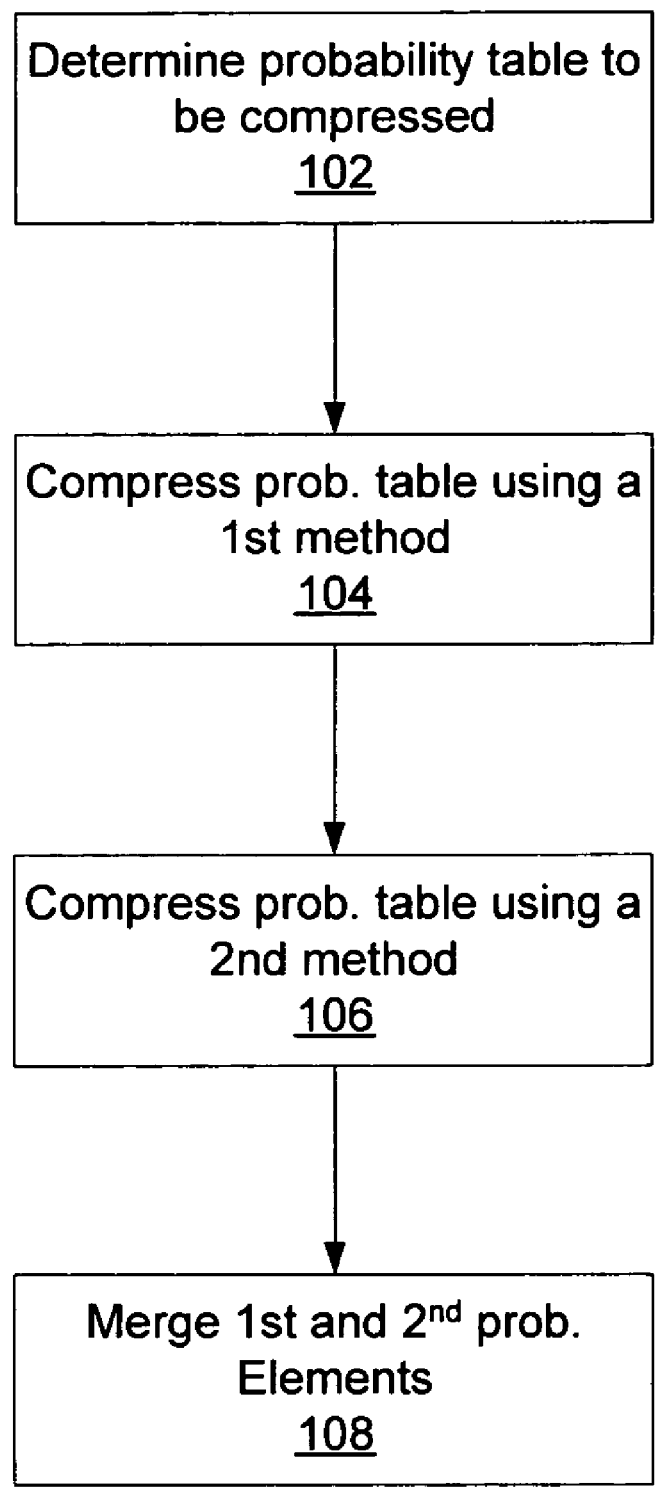
FIG. 1 is a flow diagram illustrating a method of compressing probability tables that relates to the present invention.

The present invention is initially described in reference to FIG. 1. FIG. 1 shows a block flow diagram for a method of implementing a computer for the compression of probability tables through the use of compressed probability tables. At step 102 the method determines a probability table that is to be compressed, wherein the probability table contains a plurality of probability elements. At step 104, the probability table is compressed using a first probability table compression method, wherein the probability table compression method creates a first compressed probability table, the first compressed probability table containing a plurality of probability elements. Next, at step 106, the probability table is again compressed using a second probability table compression method, wherein the probability table compression method creates a second compressed probability table, the second compressed probability table containing a plurality of probability elements. Lastly, at step 108 the first compressed probability element is merged with a second compressed probability element in order to produce a merged compressed probability element.

Figure 5:
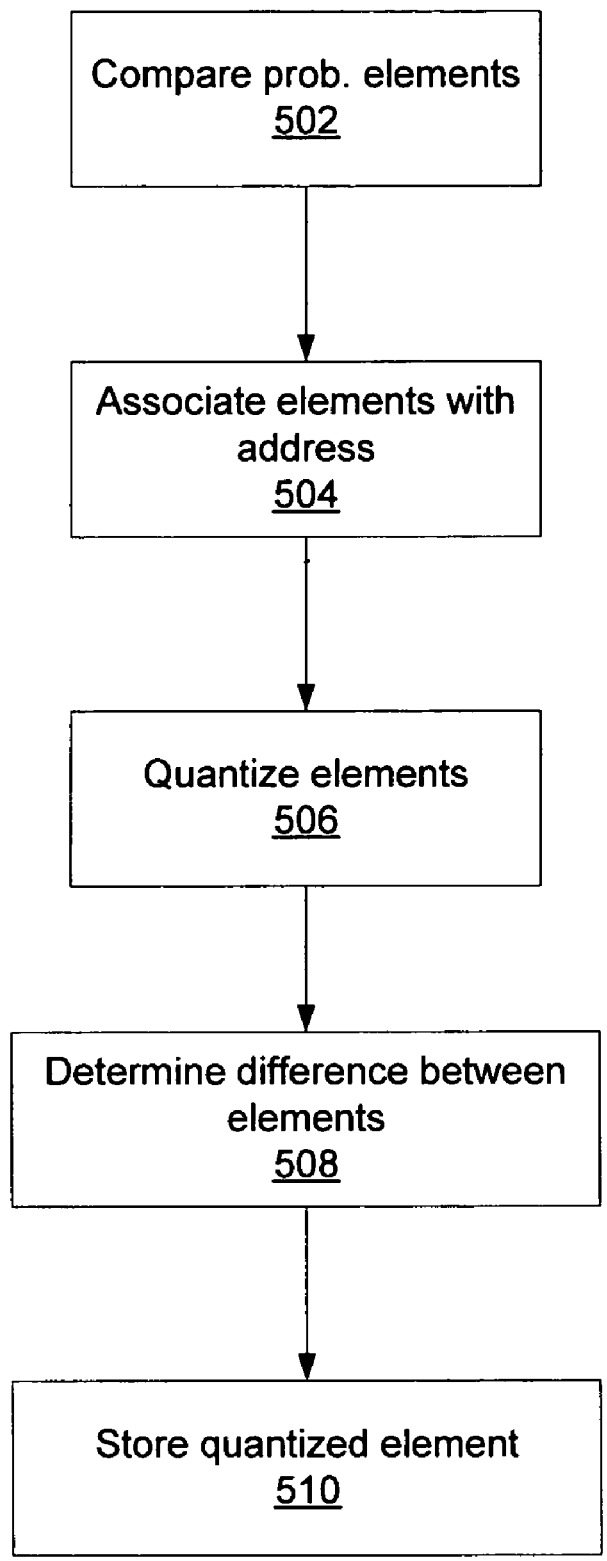
FIG. 5 is a flow diagram illustrating a method of using discrepancy tables that relates to embodiments of the present invention.

FIG. 5 is a flow diagram that illustrates a further aspect of the present invention wherein discrepancy tables are utilized to store probability values that are not reliably estimated by compression techniques. At step 502 each probability element of a probability table is compared with a corresponding merged compressed probability element. Next, at step 504, the corresponding probability element and merged compressed probability element are associated with a probability look-up table element address.

At step 506, then the probability element and the merged compresses probability element are quantized to a pre-specified degree. The difference between each probability element of the probability table and the corresponding merged compressed probability element is calculated at step 508. Further, it is also determined at step 508 if the difference between the probability element and the merged compressed probability element is greater than a variable threshold. And lastly at step 510, if the difference between the probability element and the merged compressed probability element is greater than a variable threshold, then the quantized probability element and the probability look-up table element address of the quantized probability element are stored within a discrepancy table element.

Figure 2:
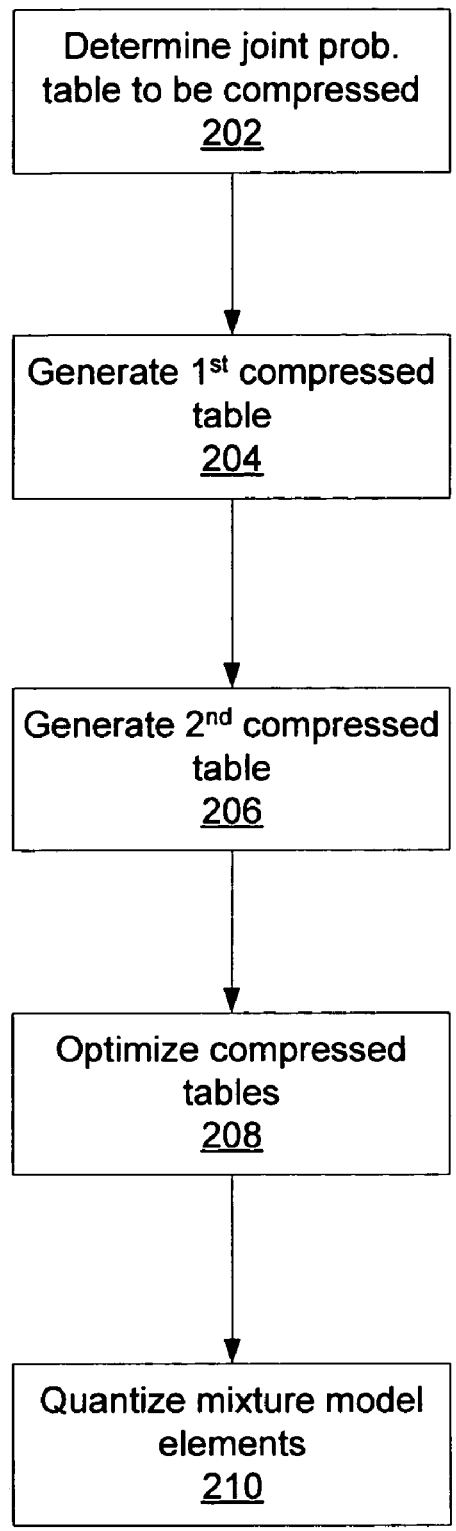
FIG. 2 is a flow diagram illustrating a method of compressing probability tables using a mixture model method.

FIG. 2 illustrates a flow diagram of an aspect of the present invention that comprises a method for the compression of a probability table using mixture model probability table compression. At step 202 the method determines a joint probability table that is to be compressed, wherein the joint probability table contains a plurality of probability elements. At step 204, a first compressed probability table is generated, the first compressed probability table containing compressed probability mixture elements. A second compressed probability table is generated at step 206, the second probability table containing compressed probability mixture coefficients. At step 208, the compressed first and second probability tables are optimized in order to generate a compressed mixture model of the joint probability table, wherein the compressed mixture model contains compressed mixture model elements. Lastly, at step 210, the compressed mixture model elements of the compressed mixture model are quantized into integers quantized to a pre-specified degree.

The above-mentioned method for the compression of a joint probability table using a mixture model method is accomplished as follows. For notational convenience, define $X_{a,b} \equiv (X_a, \ldots, X_b)$, the sequence of random variables $X_i$ for $i=a, \ldots, b$. Thus $P(X_1, \ldots, X_N) = P(X_{1,N})$. We want to compress the joint probability table $P(X_{1,N})$. We do so by using a mixture model to approximate $P(X_{1,N})$. In particular, we introduce a complete set of mixtures represented by a hidden variable $\mu$ as follows:

$$P(X_{1,N}) = \sum_{l=1}^{M} P(\mu_l, X_{1,N}) \quad \text{(Equation 8)}$$

$$= \sum_{l=1}^{M} P(\mu_l, X_{1,k}, X_{k+1,N}) \quad \text{(Equation 9)}$$

$$= \sum_{l=1}^{M} P(X_{k+1,N} \mid \mu_l, X_{1,k}) P(\mu_l, X_{1,k}) \quad \text{(Equation 10)}$$

$$= \sum_{l=1}^{M} P(X_{k+1,N} \mid \mu_l) P(\mu_l, X_{1,k}) \quad \text{(Equation 11)}$$

In Equation 10 and 11, we assume that:

$$P(X_{k+1,N} \mid \mu_l, X_{1,k}) = P(X_{k+1,N} \mid \mu_l) \quad \text{(Equation 12)}$$

Note that $P(X_{k+1,N}|\mu_l)$ is a mixture and $P(\mu_l, X_{1,k})$ is a mixture coefficient. In general the assumption in Eq. (12) is only an approximation; however for any finite, discrete, joint probability table, it is easy to show that there exists a finite $M_{exact}$ such that the model presented above is exact. Given the model in Eq. (11), we can now tune the amount of compression by varying M between 1 and $M_{exact}$. In general, the compression will be lossy.

Memory Usage Comparison

The $X_i$'s are discrete random variables that can have one of F different values. Thus, the joint probability table, $P(X_{1,N})$, has $F^N$ distinctive probability elements, which implies that the memory size grows exponentially with N. When there are C classes and each of them has its own joint probability table, the total memory size $T_1$ the scanning n-tuple classifier is given by:

$$T_1 = CF^N \quad \text{(Equation 13)}$$

Similarly the memory usage, $T_2$, of the mixtures and mixture coefficients from the model in Eq. (11) is given by $$T_2 = CM(F^k + F^{N-k}) \quad \text{(Equation 14)}$$

The memory compression ratio $T_2/T_1$ is determined by the number of mixtures, M, and the number of conditional variables k:

$$\frac{T_2}{T_1} = M(F^{k-N} + F^{-k}) \quad \text{(Equation 15)}$$

We set k=[N/2], since for given M and N, this value of k minimizes the number of model parameters. For instance, when N=5, F=9, which are the typical configurations in our recognition system, the best possible compression ratio is 1/73 with M=1 and k=2. This calculation is included as an example. Actual compression rates may be higher or lower depending on system configuration.

Optimization Algorithm

Since we have introduced the mixtures as hidden variables, we use an EM Algorithm to optimize the parameters of our mixture model under the constraints that $$1 = \sum_{l}^{M} P_t(\mu_l \mid_{1,k}) \quad \text{(Equation 16)}$$

$$1 = \sum_{X_{k+1,N}} P_t(X_{k+1,N} \mid \mu_l) \quad \text{(Equation 17)}$$

where the t subscript indicates the iteration index of the EM Algorithm. The resulting parameter update rules are:

$$P_{t+1}(\mu_l \mid X_{1,N}) = \frac{\sum_{X_{k+1,N}} P(X_{1,N}) P_t(\mu_l \mid X_{1,N})}{\sum_{X_{k+1,N}} P(X_{1,N})} \quad \text{(Equation 18)}$$

$$P_{t+1}(X_{k+1,N} \mid \mu_l) = \frac{\sum_{X_{1,k}} P(X_{1,N}) P_t(\mu_l \mid X_{1,N})}{\sum_{X_{1,N}} P(X_{1,N}) P_t(\mu_l \mid X_{1,N})} \quad \text{(Equation 19)}$$

where $$P_t(\mu_l \mid X_{1,N}) = \frac{P_t(\mu_l \mid X_{1,k}) P_t(X_{k+1,N} \mid \mu_l)}{\sum_j P_t(\mu_j \mid X_{1,k}) P_t(X_{k+1,N} \mid \mu_j)} \quad \text{(Equation 20)}$$

Note that in the above equations, the sums over $X_{1,k}$ imply Sums over all possible k-tuples, similarly for $X_{1,N}$. It is to be understood that other optimization methods known to those skilled in the art could also be used.

Figure 3:
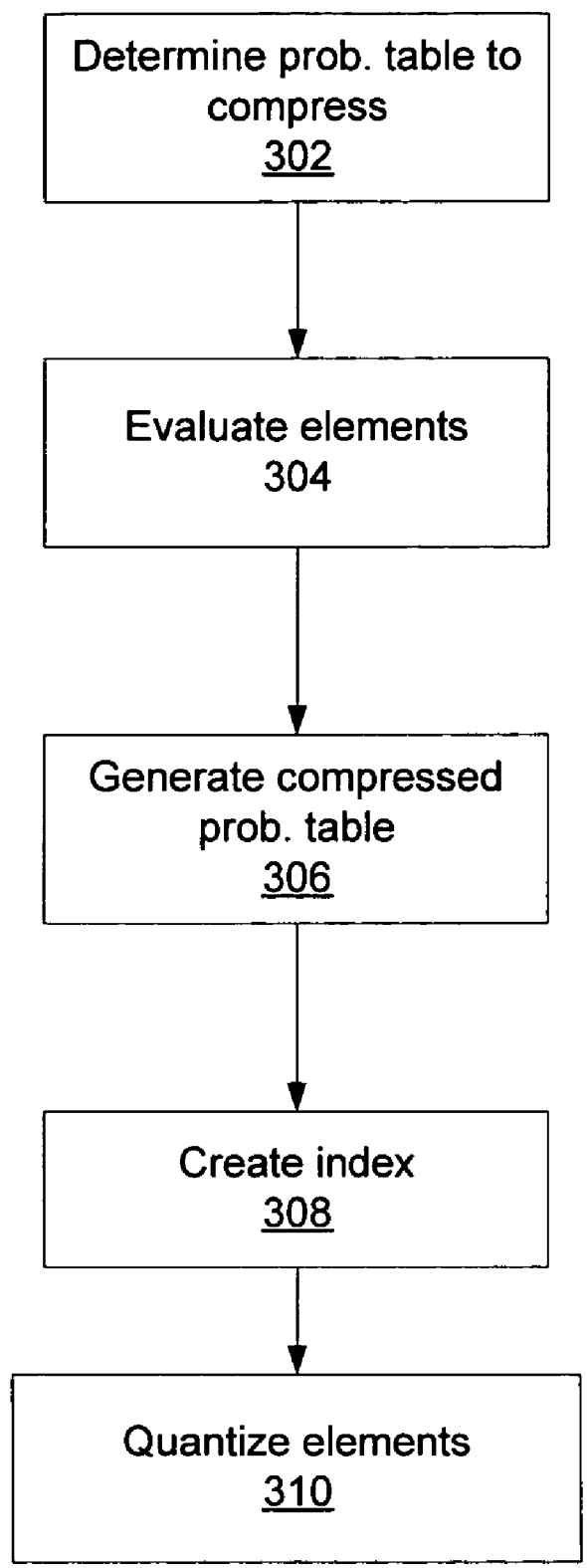
FIG. 3 is a flow diagram illustrating a method of compressing probability tables using a distributional clustering method.

FIG. 3 illustrates a flow diagram of an aspect of the present invention that comprises a method for the compression of a probability table using distributional clustering. Initially, at step 302, the method determines a probability table that is to be compressed, wherein the probability table contains a plurality of probability elements. Next, at step 304 the method evaluates the probability elements of the probability table in order to determine related probability elements of the probability table that can be replaced with a compressed probability element and at step 306 generates a compressed probability table. The compressed probability table generated at step 306 contains compressed probability elements, wherein the probability table elements that have been determined to have related values are represented by a single compressed probability element. At step 308 an index is created for the compressed probability table that maps the index for each probability element of the probability table to a new index for the corresponding compressed probability element of the compressed probability table. The indices of similar probability elements will map to the index of a single compressed probability element. At step 310 the probability elements of the compressed probability table are quantized into integers of a pre-specified degree.

Clustering Algorithm

The above-mentioned method for the compression of a probability table using distributional clustering is described as follows. Given the distance metric defined above and the desired number of clusters M, the optimal solution to the clustering problem is the one that minimizes the total within-cluster distance out of all possible permutations. Unfortunately this is a combinatorial problem with exponential complexity.

The present invention sorts the probability distributions into a list ordered by decreasing mutual information with the class variable, defined as: $I(C|T_i)=H(C)-H(C|T_i)$ where $H(\ )$ represents entropy and $H(C)$ is constant for all distributions. Thereafter, M+1 clusters are initialized as singletons with the top M+1 distributions on the list. It is to be understood that any measure of distance between distributions known to those skilled in the art could also be used.

As per equation 7, the two clusters with minimum distance are merged, and a new cluster is created consisting of the next distribution in the sorted list. The clusters are iterated until the last distribution on the list has been processed.

In a second stage, refinement, the cluster membership of each distribution is adjusted using the following annealing-like process, repeated a times. The within-cluster distance between each distribution and its cluster center is computed using Equation 7. Thereafter, the distributions are sorted in the order of decreasing within cluster distance.

For each distribution in the sorted list, suppose its cluster assignment is $E_i$, and then compute its distance, $D_j(T_k, E_k)$ to all cluster centers. Next, find the cluster $E_j$ with the minimum distance and if $j \neq i$ then move $T_k$ to cluster $E_j$ and update distributions $P(C|E_i)$ and $P(C|E_j)$.

Figure 6:
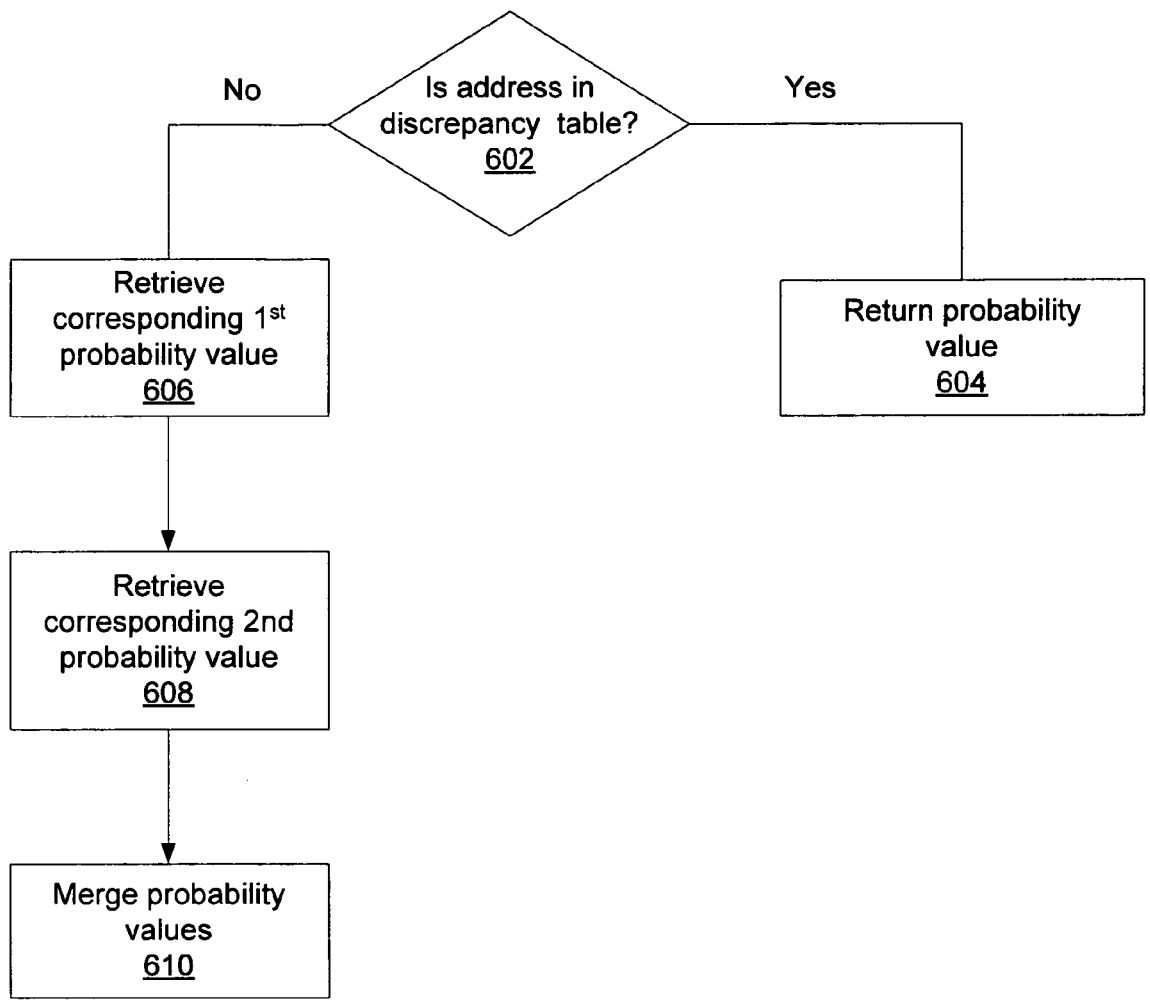
FIG. 6 is a flow diagram illustrating a method of recovering probability elements.

FIG. 6 illustrates a method of implementing a computer for the recovery of selected probability elements through the use of compressed probability tables. At step 602, it is determined if a probability look-up table element address is located within a discrepancy table, and at step 604 returning a corresponding probability value if the probability look-up table element address is located in the discrepancy table. At step 606, a first compressed probability element is retrieved, the probability element being compressed using a first compression method, that corresponds with the probability look-up table element address if the probability look-up table element address is not located in the discrepancy table. Further, at step 608, a second compressed probability element is retrieved, the probability element being compressed using a second compression method, that corresponds with the probability look-up table element address if the probability look-up table element address is not located in the discrepancy table.

At step 610, the retrieved compressed probability elements are merged in order to produce a merged probability element. It must be noted that more than two compressed probability table elements may be merged in order to produce a merged probability element. The only restriction is that the compressed probability elements to be merged must have been compressed using differing compression methods.

Figure 4:
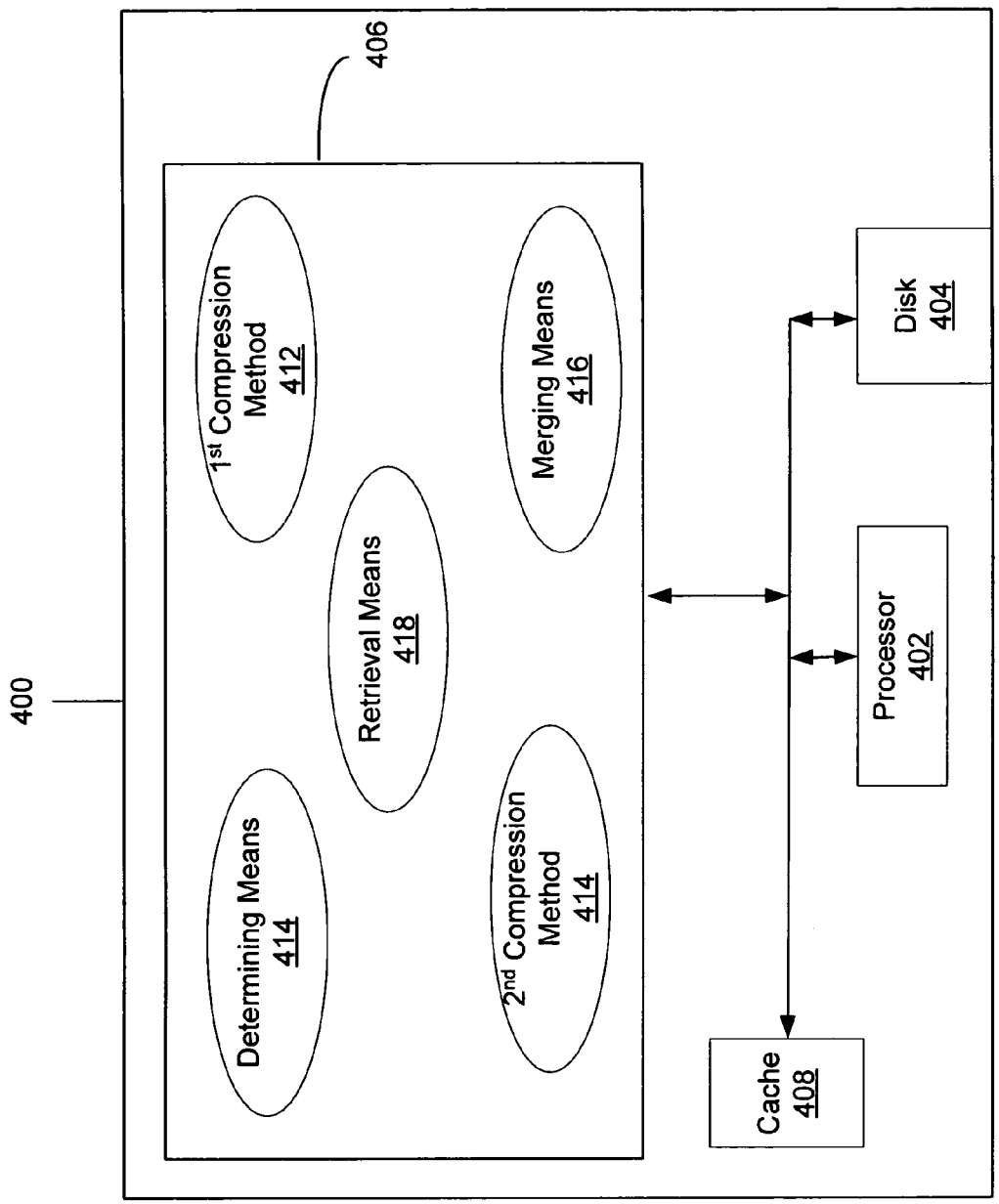
FIG. 4 is a diagram illustrating a computer system that relates to the present invention.

FIG. 4 is a general block diagram depicting the underlying system architecture for employing the probability table compression methods of the present invention. In its most general form, the architecture may comprise a client-server system employing software for executing the techniques of the present invention. For example, the server 400 includes a Central Processing Unit (CPU) 402, and, disk 404 and main memory 406. The CPU 402 is the component in which most of the calculations are performed.

The probability tables to be compressed via the techniques of the present invention may additionally be stored on a medium such as a hard drive disk 404 or other high density, magnetic or optical media storage device. In addition, the main memory 406 is available in order to perform the calculations in the CPU. Optionally, a cache 408 may be retained in order to speed up all the calculations for this system. It should be understood to skilled artisans that this is not the only system architecture that may support such a system, though it is the most general one. Another possible architecture could include a desktop personal computer system with a keyboard, screen and user interface which may be more suitable in a single client environment.

The software elements of the programmed computer are illustrated for purposes of clarity as executable in the main memory 406, but as persons skilled in the art will understand they may not in actuality reside simultaneously or in their entireties in memory 406.

The software elements of the computer system for the compression of probability tables through the use of compressed probability tables comprises a means 410 for determining a probability table that is to be compressed, wherein the probability table contains a plurality of probability elements. Additionally, the determining means 410 determines if a probability look-up table element address is located within a discrepancy table. The system also comprises a means 412 for compressing the probability table using a first probability table compression method, wherein the probability table compression method creates a first compressed probability table, the first compressed probability table containing a plurality of probability elements.

The system further comprises a means 414 for compressing the probability table using a second probability table compression method, wherein the probability table compression method creates a second compressed probability table, the second compressed probability table containing a plurality of probability elements. Still further, the system comprises a means 416 for merging a first compressed probability element with a second compressed probability element in order to produce a merged compressed probability element. Yet further, the system comprises a compressed probability element retrieval means 418 for retrieving probability elements.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed:

1. A method of implementing a computer for the compression of probability tables and the recovery of selected probability elements through the use of compressed probability tables, comprising the steps of:

determining a probability table that is to be compressed, wherein the probability table contains a plurality of probability elements;

compressing the probability table using a first probability table compression method, wherein the probability table compression method creates a first compressed probability table, the first compressed probability table containing a plurality of probability elements;

compressing the probability table using a second probability table compression method, wherein the probability table compression method creates a second compressed probability table, the second compressed probability table containing a plurality of probability elements; and merging a first probability element with a second probability element in order to produce a merged probability element.

2. The method of claim 1, further comprising the use of a discrepancy table to conditionally replace the merged probability elements based on the absolute difference between the merged probability element and a corresponding probability element being larger than a variable threshold.

3. The method of claim 2, wherein the probability elements in the compressed tables and the discrepancy table are quantized to a pre-specified degree.

4. The method of claim 3, wherein the quantized probability element and a probability look-up table element address of the quantized probability element are stored within a discrepancy table element.

5. The method of claim 4, wherein the probability table is compressed using a mixture model probability table compression method.

6. The method of claim 4, wherein the probability table is compressed using a distributional clustering probability table compression method.

7. A method for the compression of a probability table using distributional clustering, comprising the steps of:

determining a probability table that is to be compressed, wherein the probability table contains a plurality of probability elements;

evaluating the probability elements of the probability table in order to determine related probability elements of the probability table that can be replaced with a compressed probability element;

generating a compressed probability table, the compressed probability table containing probability elements that are compressed, wherein the probability table elements that have been determined to have related values are represented by a single compressed probability element; and creating an index for the compressed probability table that maps the index for each probability element of the probability table to a new index for the corresponding compressed probability element of the compressed probability table, wherein the indices of similar probability elements will map to the index of a single compressed probability element.

8. The method of claim 7, wherein the step of evaluating the probability elements further comprises the step of sorting the probability elements into a list that is ordered by decreasing mutual information with a class variable.

9. The method of claim 8, wherein the step of evaluating the probability elements further comprises the step of initializing M+1 clusters as singletons with a top M+1 probability element on the list.

10. The method of claim 9, wherein the step of generating an estimated probability element value comprises the step of merging two clusters with a minimum distance in accordance with $D_f(E_i,E_j)=P(E_i)\cdot D(P(C|E_i)\|P(C|E_i vE_j))+P(E_j)\cdot D(P(C|E_j)\|P(C|E_i vE_j))$, the next probability element on the list is added as a singleton cluster and the merging of two clusters with a minimum distance is repeated until the last probability element on the list has been processed.

11. The method of claim 10, further comprising the step of computing the within-cluster distance between each estimated probability element and its cluster center using the equation $D_f(E_i,E_j)=P(E_i)\cdot D(P(C|E_i)\|P(C|E_i vE_j))+P(E_j)\cdot D(P(C|E_j)\|P(C|E_i vE_j))$.

12. The method of claim 11, further comprising the step of sorting the estimated probability elements in an order of decreasing within-cluster distance.

13. The method of claim 12, further comprising the step of computing the distance for each estimated probability element $D_f(T_k, E_k)$, to all cluster centers in order to find the cluster $E_j$ with the minimum distance to the estimated probability element, wherein if j is not equal to i then the probability element $T_k$ is moved to cluster $E_j$.

14. The method of claim 13, wherein the step of generating an estimated probability table further comprises the step of quantizing the estimated probability element values into an integer of a predetermined size.

15. A method for the compression of a probability table using mixture model probability table compression, comprising the steps of:

determining a joint probability table that is to be compressed, wherein the joint probability table contains a plurality of probability elements;

generating a first compressed probability table, the first compressed probability table containing compressed probability mixture elements;

generating a second compressed probability table, the second probability table containing compressed probability mixture coefficients;

optimizing the compressed first and second probability tables in order to generate a compressed mixture model of the joint probability table, wherein the compressed mixture model contains compressed mixture model elements; and quantizing the compressed mixture model elements of the compressed mixture model into integers of a predetermined size.

16. The method of claim 15, wherein the steps of generating a first and second compressed probability table to compress a joint probability table represented by $P(X_{1,N})$, the first and second compressed probability tables are calculated according to $$P(X_{1,N}) = \sum_{l=1}^{M} P(X_{k+1,N} | \mu_l) P(\mu_l, X_{1,k}),$$

wherein $P(X_{k+1,N}|\mu_l)$ represents a probability mixture and $P(\mu_l, X_{1,k})$ represents a probability mixture coefficient.

17. The method of claim 16, wherein the compressed first and second probability tables are optimized according to $$P_t(\mu_l | X_{1,N}) = \frac{P_t(\mu_l | X_{1,k}) P_t(X_{k+1,N} | \mu_l)}{\sum_j P_t(\mu_j | X_{1,k}) P_t(X_{k+1,N} | \mu_j)}.$$

18. A method of implementing a computer for the recovery of selected probability elements through the use of compressed probability tables, comprising the steps of:

determining if a probability look-up table element address is located within a discrepancy table, returning the corresponding probability element if the probability look-up table element address is located in the discrepancy table;

retrieving a compressed probability element, which has been compressed using a first compression method that corresponds with the probability look-up table element address if the probability look-up table element address is not located in the discrepancy table;

retrieving a compressed probability element, which has been compressed using a second compression method, that corresponds with the probability look-up table element address if the probability look-up table element address is not located in the discrepancy table; and merging the retrieved compressed probability elements in order to produce a merged probability element.

19. The method of claim 18, wherein the step of retrieving a compressed probability element comprises retrieving at least two probability elements that have been compressed using differing compressions.

* * * * *